United States Patent [19]

Zimmerly

[11] Patent Number: 4,531,532

[45] Date of Patent: Jul. 30, 1985

[54] SNAP-ON VALVE GASKET

[75] Inventor: Robert D. Zimmerly, Kenosha, Wis.

[73] Assignee: Ladish Co., Cudahy, Wis.

[21] Appl. No.: 529,102

[22] Filed: Sep. 2, 1983

[51] Int. Cl.³ ............................................. F16K 31/02
[52] U.S. Cl. ..................................... 137/15; 137/315;
 251/133; 251/357
[58] Field of Search .................. 137/315, 15; 251/357, 251/129, 133

[56] References Cited

U.S. PATENT DOCUMENTS

| 1,175,980 | 3/1916 | Osborne | 251/357 |
|---|---|---|---|
| 2,002,672 | 5/1935 | Melott | 251/357 |
| 2,397,269 | 3/1946 | Kelly | 251/357 |
| 2,482,198 | 9/1949 | Melichar | 251/357 |
| 2,860,266 | 11/1958 | Schrader | 251/357 |
| 3,145,733 | 8/1964 | Shaw et al. | 251/357 |
| 3,505,888 | 4/1970 | Denkowski | 251/133 |
| 3,511,475 | 5/1970 | Pfau | 251/357 |
| 4,408,745 | 10/1983 | Swiers et al. | 251/357 |

Primary Examiner—A. Michael Chambers
Attorney, Agent, or Firm—Fuller, House & Hohenfeldt

[57] ABSTRACT

A sanitary valve assembly including a valve and a field replaceable gasket. The gasket is formed with a plurality of resilient fingers which conform to a frusto-conical surface of the valve head. The apex end of the valve head frusto-conical surface is provided with a laterally extending shoulder. To assemble the gasket to the valve head, the gasket is pushed onto the valve head so that the fingers deflect as they contact the shoulder. Upon passing over the shoulder, the fingers snap back to their undeflected position to engage the shoulder and retain the gasket on the valve when in the relaxed condition. The gasket fits loosely on the valve head when the valve assembly is in the open position, thereby permitting the assembly to be cleaned in place by flushing washing fluid through the clearances between the valve head and gasket.

15 Claims, 10 Drawing Figures

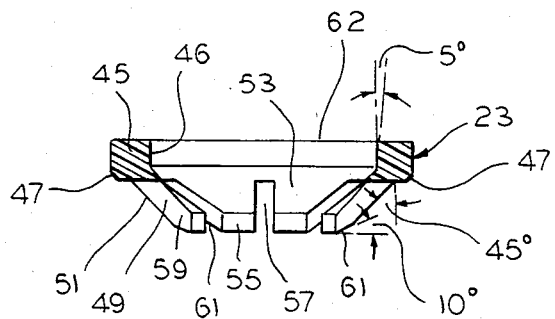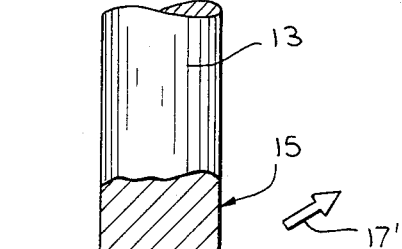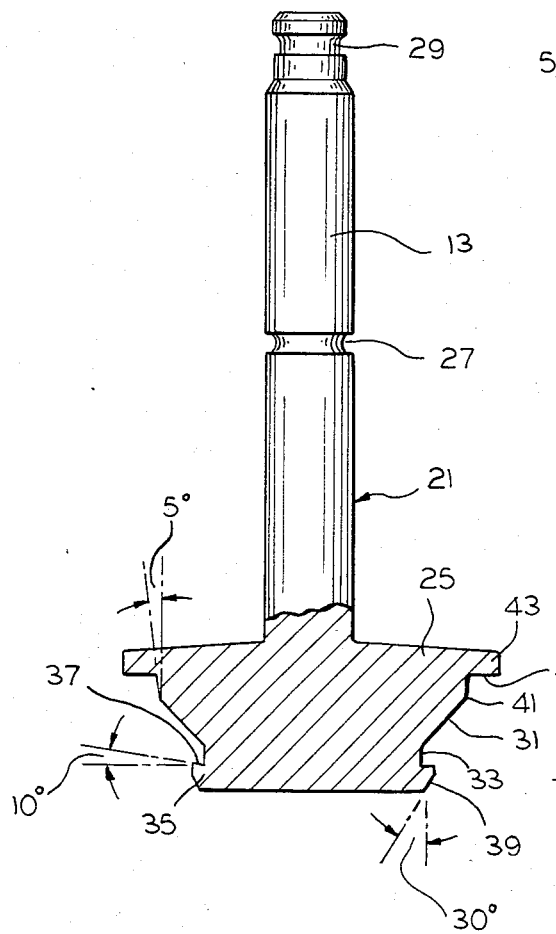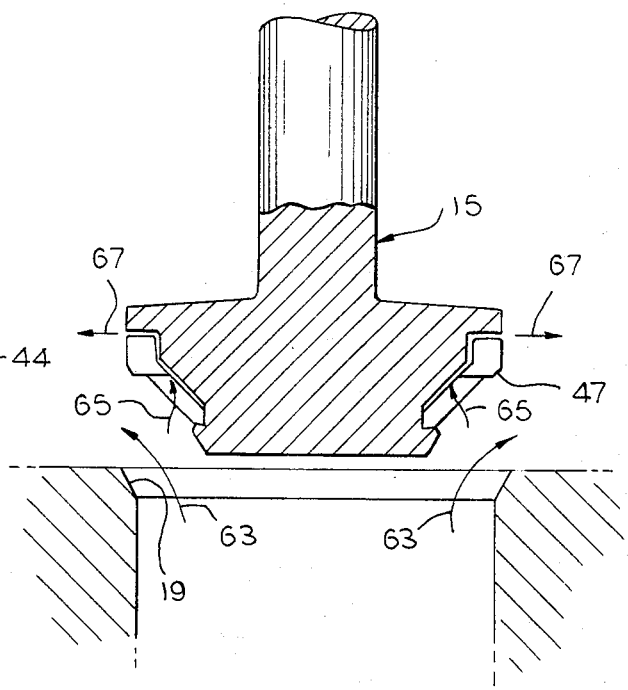

SNAP-ON VALVE GASKET

BACKGROUND OF THE INVENTION

1. Field of the Invention

This invention pertains to valve assemblies, and more particularly to sanitary valves having field replaceable gaskets that are cleanable in place.

2. Description of the Prior Art

It has long been known to equip linearly actuated valves with relatively soft gaskets for contacting a valve seat to provide a tight seal. For Example, U.S. Pat. No. 107,841 discloses a facing of rubber or other elastic substance placed around an oblique or curved portion of the valve stem. U.S. Pat. No. 1,538,126 teaches the use of a copper cup-shaped bearing in conjunction with the beveled surface of a valve stem. The copper, being relatively soft, is able to closely conform to the contour of the valve seat. U.S. Pat. Nos. 3,326,520; 3,445,089; and 3,531,086 illustrate carburetor needle valves with tips of rubber or similar material for contacting and sealing the valve seat of a carburetor float chamber.

A common feature of prior art valve gaskets is the difficulty of replacing the gaskets in the field. Installing a new rubber or other elastic tip or facing requires stretching and drawing over relatively large projections on the valve stem. In addition, as exemplified by U.S. Pat. No. 3,531,086, a portion of the valve stem may be crimped to hold the rubber tip more or less permanently in place. In some other prior art designs, it is necessary to heat the gasket in order to work it onto the valve stem.

With a construction such as is illustrated in U.S. Pat. No. 1,538,126, it is necessary to mechanically disassemble the valve elements, such as cotter pins, nuts, and screws, in order to remove the gasket. The reverse operation must be performed to install the new gasket. These disassembly and reassembly operations are time consuming and inefficient.

As a result of the gasket replacement difficulties with prior art devices, it is common practice to replace both the valve stem and gasket as a unit. This is wasteful because usually only the gasket requires replacement.

A further problem with the aforementioned prior art valve stems and gaskets is that they are not suitable for food handling applications. Sanitary installations require the use of non-corrosive materials, such as stainless steel and certain synthetic plastics. Further, the equipment should be easily cleanable, because cleaning is non-productive. Ease of cleaning requires the use of components having a minimum number of crevices for food particles to lodge in during operation. In addition, built-up particles must be easily flushable during cleaning. Ideally, machinery, including valve elements, for handling consumable products should be cleanable without the necessity of any disassembly and reassembly, i.e., the machinery should be cleanable with all the components in place. The prior art valve elements contain crevices that can trap food particles, and the crevices cannot be cleaned without laborious disassembly and reassembly.

Thus, a need exists for a sanitary valve assembly that incorporates a field replaceable gasket for sealing against the valve seat and that is quickly and efficiently cleanable in place.

SUMMARY OF THE INVENTION

In accordance with the present invention, a sanitary linear valve assembly is provided that includes a field replaceable gasket for sealing against a valve seat. This is accomplished by apparatus which includes a valve stem comprising a valve stem plug and a valve stem shaft. The valve stem plug is formed with an external frusto-conical surface having its axis coincident with the axis of the valve stem shaft. The frusto-conical surface is located between two axially spaced laterally extending shoulders.

To create a tight seal with the valve seat, a gasket of relatively soft and resilient material is provided in conjunction with the valve stem. The gasket is manufactured as an annular ring of generally rectangular cross-section. The annular ring fits loosely on a corresponding external surface of the valve stem plug, thus creating a seat assembly. The gasket is fabricated with a conical portion extending from one end of the annular ring. The conical portion has an internal surface that conforms to the frusto-conical surface of the valve stem plug. The gasket conical portion has an external surface that is generally parallel to the internal conical surface, thus forming a hollow truncated cone. The gasket is axially retained on the valve stem plug between the two shoulders.

To allow easy assembly of the gasket to the valve stem, the hollow frusto-conical portion of the gasket is formed with several slots. The slots extend from the end of the conical portion of the rectangular ring, thus creating a plurality of resilient fingers. To assemble the gasket to the valve stem, the gasket is pushed onto the frusto-conical surface of the valve stem plug. The gasket fingers bend as they pass over the smaller shoulder at the apex end of the valve stem plug frusto-conical surface. At the point at which the gasket rectangular ring abuts the shoulder at the base end of the valve stem plug frusto-conical surface, the fingers have passed over the smaller shoulder. The fingers then snap back to their undeflected position, thus retaining the gasket between the two shoulders.

The present invention is also concerned with adapting the field replaceable gasket to sanitary applications. For that purpose, the gasket and valve stem plug are dimensioned so that the gasket fits loosely on the valve stem plug and is capable of both axial and lateral movement relative thereto. When the seat assembly is closed against the valve seat, the gasket is firmly pressed against the valve stem plug to create a tight seal. However, when the valve stem is opened, clearances are created between corresponding conical surfaces and shoulder portions of the gasket and valve stem plug. This allows a washing fluid to be flushed through the clearances of the open valve to flush out food particles that lodged in the components during normal operation.

To enhance the flushing operation, an external circumferential surface of the valve stem plug and corresponding gasket ring internal surface diverge in the same direction as the valve stem plug and gasket conical surfaces. This results in increased conductivity of the flow path between the gasket and valve stem plug for the washing fluid. Consequently, the valve assembly can be cleaned in place, which eliminates non-productive disassembly and reassembly time.

Other objects and advantages of the invention will become apparent from the description.

BRIEF DESCRIPTION OF THE DRAWINGS

FIG. 2 is a detailed side view, partly in section, of the sanitary valve stem of the present invention;

FIG. 4 is a sectional view taken along lines 4—4 of FIG. 3;

FIG. 5 is a partial cross-section view of the valve stem and gasket comprising the seat assembly of the present invention in the closed position against a valve seat;

FIG. 6 is a partial cross-sectional view similar to FIG. 5 but showing the seat assembly in the open position;

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
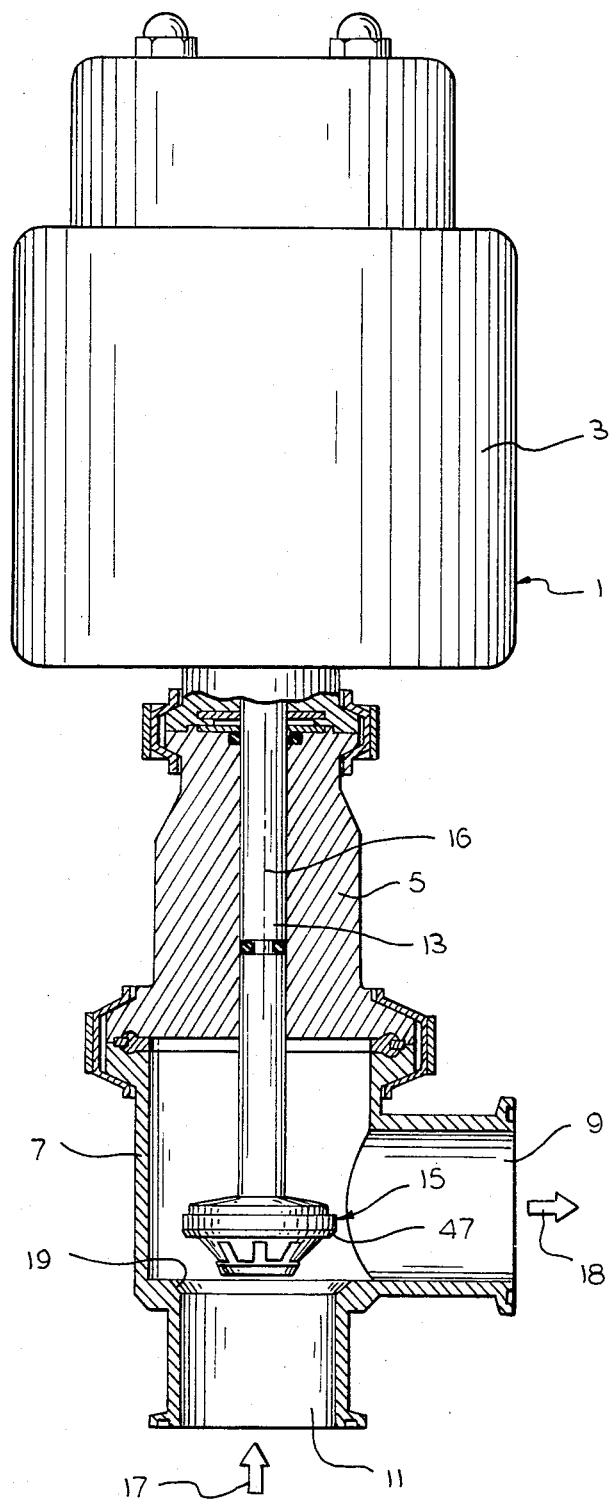
FIG. 1 is a side view, partly in section, of one form of a fluid control apparatus that incorporates the sanitary valve assembly of the present invention, showing the valve assembly in the open position.

Referring to FIG. 1, a fluid control valve 1 is illustrated which includes the present invention. The valve finds particular usefulness in handling liquid and viscous food products. However, it will be understood that the invention is not limited to sanitary applications.

The control valve 1 includes a motor 3 mounted to a bonnet portion 5. The lower end of the bonnet portion 5 is detachably assembled to a valve body portion 7 having ports 9 and 11. An exemplary design for assembling the motor, bonnet, and valve body of the control valve, which do not constitute a part of the present invention, is described in U.S. Pat. No. 3,110,471.

The bonnet 5 guides the valve stem shaft 13 of the seat assembly 15 of the present invention. The motor 3 actuates the seat assembly in a linear direction along the longitudinal axis 16 of the valve stem. In FIG. 1, the valve is shown in the open position so that fluid entering port 11 may flow out port 9 in the direction illustrated by arrows 17 and 18, respectively.

Figure 3:
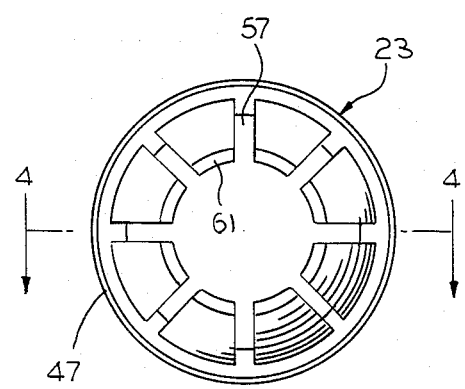
FIG. 3 is an end view of the sanitary gasket of the present invention.

In the preferred embodiment of the present invention, the seat assembly 15 includes a valve stem 21, FIG. 2, and a gasket 23, FIGS. 3 and 4. The gasket is positioned on the valve stem as illustrated in FIGS. 5 and 6.

The valve stem 21 comprises a valve stem shaft 13 and a valve stem plug 25, FIG. 2. The valve stem shaft 13 may be formed with a groove 27 for a conventional sealing element, not shown. The valve stem shaft terminal end 29 forms no part of the present invention; it is machined to accommodate well-known means, not shown in FIG. 1, for attaching to the motor 3.

In the illustrated embodiment, the valve stem plug 25 is constructed with a frusto-conical surface 31 having its axis coincident with the axis 16 of valve stem shaft 13, FIG. 2. The preferred angle of the conical surface is 45°. The apex end of surface 31 terminates in a cylindrical surface 33. To retain the gasket 23 in one direction on the valve stem, a shoulder 35 extends laterally from the cylindrical surface 33. The surface 37 of shoulder 35 is preferably not perpendicular to the valve axis; rather it slopes about 10° in the same general direction as surface 31. The shoulder 35 is also formed with an external chamfer 39. The base end of the tapered surface 31 terminates in an external circumferential surface 41. It is a feature of the present invention that surface 41 is not cylindrical, but rather it tapers about 5° in the general direction of surface 31. The functions of sloped surface 37, chamfer 39, and sloped surface 41 will be explained presently. To cooperate with shoulder 35 for retaining the gasket on the valve stem and to support the gasket when it is pressed against the valve seat 19, a shoulder 43, having surface 44 generally perpendicular to the valve axis, extends laterally from sloped surface 41.

To suit the application of the present invention to sanitary applications, the choice of materials is critical. Thus, a preferred material for the valve is a stainless steel, such as type 316 stainless steel.

Further in accordance with the present invention, the valve 1 includes a field replaceable gasket 23, FIGS. 3 and 4. A suitable material for sanitary applications is a TFE plastic. Elastomer gaskets of a harder durometer also would be suitable. The gasket is constructed with an annular ring 45 of generally rectangular cross-section. Ring internal surface 46 is sloped to correspond with the valve stem plug 41. To contact and provide a seal with tapered valve seat 19, the gasket ring is provided with an external chamfer 47.

The gasket 23 is formed with a hollow frusto-conical section 49 which extends from one end of the ring 45. The section 49 is defined by generally parallel external and internal surfaces 51 and 53, respectively. Inner surface 53 corresponds to valve stem conical surface 31. The gasket frusto-conical section terminates at its outer end in a cylindrical surface 55 that corresponds to valve stem surface 33.

To allow quick and economical field replacement of the gasket 23, the frusto-conical section 49 is formed with a plurality of slots 57. The slots extend from surface 55 to ring 45, thus creating a circular band of resilient fingers 59. To provide additional retention of the gasket on the valve stem plug 25, the terminal ends of fingers 59 are fabricated with sloped locking surfaces 61. The locking surfaces 61 correspond to the valve stem sloped surface 37.

To assemble the gasket 23 to the valve stem 21, the valve stem head 25 is manually inserted through the gasket ring 45 until the valve stem chamfer 39 strikes the finger internal surfaces 53. Then, as the gasket is pushed into further engagement with the valve stem, the fingers 59 deflect outwardly as they pass over shoulder 35 along the chamfer 39. When ring surface 62 is fully seated against shoulder surface 44, the fingers snap back to their undeflected position. The gasket is then permanently retained between shoulders 35 and 43. Finger surfaces 61 cooperate with valve stem surface 37 to help prevent the fingers from opening.

Thus, a gasket may be easily replaced in the field. The old gasket is cut from the valve stem, as with a knife, and a new gasket can be assembled to the original valve stem without the use of special tools and with a minimum of expense and inconvenience.

As shown in FIG. 5, when the seat assembly is in the closed position, the gasket 23, particularly chamfer 47, forms a tight seal with tapered valve seat 19. In this condition, the gasket is pressed firmly onto the valve stem plug 25 along pairs of cooperating surfaces 41, 46; 44, 62; and 31,53. As a result, the fluid flow, as represented by arrow 17', is blocked.

The present invention is also concerned with in-place cleaning of the seat assembly 15. That is accomplished by dimensioning the valve stem plug 25 and gasket 23 such that when the valve is in the open position, the gasket fits loosely on the valve stem plug. As shown in FIG. 6, the gasket is capable of both axial and lateral movement with respect to the valve stem plug, because the distance between the retaining shoulders 35 and 43 is slightly greater than the length of the gasket. The designed clearances between the gasket and valve stem plug provide a path for washing fluid that is flushed through the open control valve 1, as represented by arrows 63. Arrows 65 and 67 represent the path of washing fluid that is flushed through the slots 57 of the gasket and between the ring 45 and valve stem plug. The sloped surfaces 41, 46 increase the conductivity of the flow path for the washing fluid between the ring and valve stem plug. Thus, any food particles that adhered to the seat assembly during normal operation may be removed without non-productive disassembly and reassembly of the control apparatus or the valve assembly.

Figure 7:
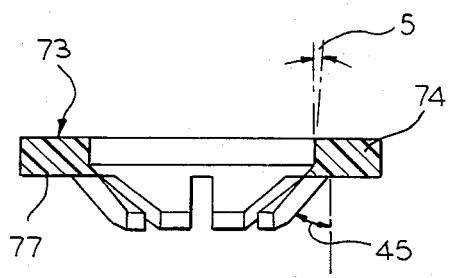
FIG. 7 is a sectional view similar to FIG. 4 but showing a modification to the gasket.
Figure 9:
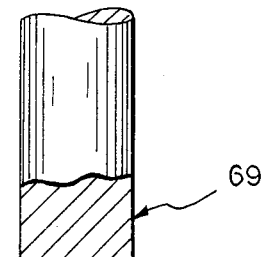
FIG. 9 is a partial cross-sectional view of the modified seat assembly in the closed position against a valve seat.
Figure 8:
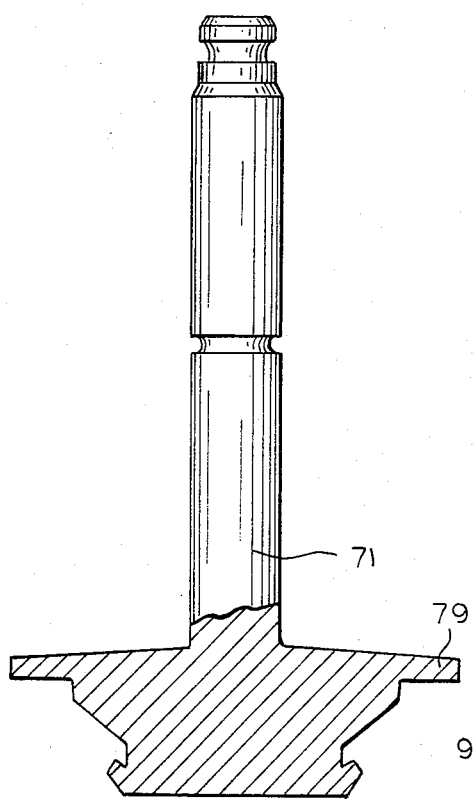
FIG. 8 is a side view, partially in section, of the valve stem similar to FIG. 2 but showing a modification thereto.

FIGS. 7-9 illustrate a seat assembly 69 comprising a modified valve stem 71, gasket 73, and valve seat 75. The gasket 73 is formed with a generally rectangular shaped ring 74 having a larger outer diameter than in the previously described gasket shown in FIG. 9, the gasket 73 contacts flat horizontal valve seat 75 along flat horizontal surface 77, thus eliminating the need for a sealing chamfer on the gasket and valve seat. To enable the valve stem 71 to operate with the same linear stroke as valve stem 21 while using the same gasket ring thickness as ring 45, the valve seat surface 75 is machined deeper than in the prior description. Shoulder 79 extends laterally from the valve stem 71 an amount corresponding to the diameter of gasket ring 74.

Figure 10:
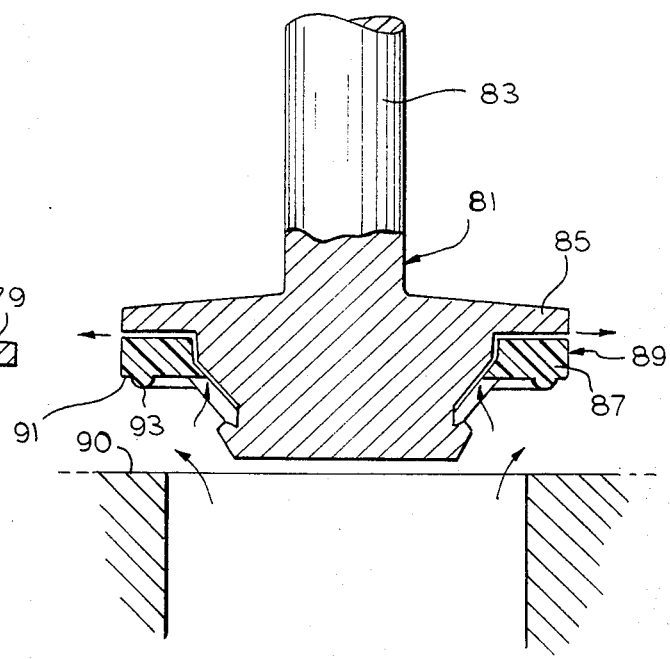
FIG. 10 is a partial cross-sectional view similar to FIG. 9 but showing the seat assembly in its open position and showing a further modification to the gasket.

FIG. 10 illustrates a further modification of the seat assembly of the present invention. The seat assembly 81 comprises a valve stem 83 with shoulder 85 extending laterally therefrom in correspondence with ring 87 of gasket 89. To seal the gasket against the flat horizontal valve seat 90, the lower surface 91 of the ring 87 is fabricated with an annular sealing bead 93, thus eliminating the need for sealing chamfers. In the particular modification shown in FIG. 10, the valve seat 90 is located at a higher position than previously, thus reducing machining requirements.

It is apparent from the foregoing that there has been provided, in accordance with the invention, a sanitary valve having a field replaceable gasket that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A valve stem and gasket assembly comprising:
   (a) a valve stem having first and second axially spaced laterally extending peripheral shoulders for retaining a gasket therebetween; and
   (b) said gasket having a plurality of resilient fingers adapted to pass over the first retaining shoulder when the fingers are in deflected condition to facilitate assembly and to engage the first retaining shoulder when the fingers are in a relaxed condition to prevent disassembly, the gasket interfitting and retained between said shoulders when the fingers are relaxed.

2. The valve stem and gasket assembly of claim 1 wherein the valve comprises a valve stem shaft and a valve stem plug, and wherein the shoulders for retaining the gasket therebetween are formed on the valve stem plug.

3. The valve stem and gasket assembly of claim 2 wherein the valve stem plug is formed with a frusto-conical surface interposed between the shoulders, and wherein the gasket fingers are substantially parallel to the valve stem plug frusto-conical surface.

4. The valve stem and gasket assembly of claim 3 wherein:
   (a) the apex end of the frusto-conical surface terminates in a cylindrical surface;
   (b) the first laterally extending shoulder includes a surface which extends generally laterally from the cylindrical surface, the generally laterally extending surface sloping in the general direction of the frusto-conical surface; and
   (c) the gasket fingers include end surfaces that are formed with sloping surfaces which conform to and cooperate with the shoulder sloping surface to aid in preventing disassembly.

5. The valve stem and gasket assembly of claim 3 wherein the axial distance between the first and second retaining shoulders is greater than the axial length of the gasket,
   so that the gasket is capable of axial and lateral movement relative to the valve stem plug when assembled thereon.

6. The valve stem and gasket assembly of claim 5 wherein the base of the valve stem plug frusto-conical surface terminates in an external circumferential surface that tapers in the same general direction as the frusto-conical surface, and wherein the gasket is formed with an annular ring having an internal tapered surface which conforms to the valve stem plug tapered external circumferential surface.

7. A fluid control apparatus comprising:
   (a) a housing having inlet and outlet ports and a valve seat;
   (b) a valve stem disposed within the housing, the valve stem having first and second axially spaced laterally extending peripheral shoulders thereon;
   (c) a gasket interfitting and axially retained on the valve stem between the first and second shoulders for engaging the valve seat, the axial length of the gasket being less than the axial spacing between the first and second shoulders of the valve stem to create axial and lateral clearances between the gasket and valve stem, the gasket having a plurality of resilient fingers adapted to pass over the first shoulder when in a deflected condition for assembly and to engage the first shoulder when in a relaxed condition to prevent disassembly; and (d) motor means mounted to the housing for linearly actuating the valve stem and gasket to sealingly engage and disengage the valve seat, so that flushing the control apparatus allows washing fluid to pass through the clearance between the gasket and valve stem to clean them in place when the gasket is not in engagement with the valve seat.

8. The fluid control apparatus of claim 7 wherein the valve stem includes a valve stem plug and a valve stem shaft, the valve stem plug being formed with a frusto-conical surface interposed between the first and second shoulders, and wherein the gasket resilient fingers conform to the valve stem plug frusto-conical surface.

9. The fluid control apparatus of claim 11 wherein:
   (a) the base end of the valve stem plug frusto-conical surface terminates in an external circumferential surface that tapers in the same general direction as the frusto-conical surface; and
   (b) the gasket is formed with an annular ring having a tapered internal surface conforming to the valve stem plug external tapered surface, so that the conductivity of the washing fluid between the conforming gasket ring and valve stem plug external surface is increased.

10. A method of permanently assembling a gasket to a valve stem, comprising the steps of:
   (a) providing a valve stem having first and second axially spaced peripheral shoulders extending laterally therefrom;
   (b) providing a gasket having an axial length less than the axial length between the two valve stem shoulders, the gasket including an annular ring adapted to pass over the first shoulder and a plurality of resilient fingers joined to the annular ring and adapted to deflect upon contact with the first valve stem shoulder;
   (c) inserting the valve stem through the gasket ring until the resilient fingers contact the first shoulder; and
   (d) pushing the gasket onto the valve stem to pass the fingers over the first shoulder, so that the fingers deflect as they pass over the first shoulder to allow assembly and resiliently snap back to engage the first shoulder to permanently retain the gasket between the first and second shoulders when in the relaxed condition.

11. The method of claim 10 wherein:
   (a) the valve stem includes a valve stem plug and a valve stem shaft, the valve stem plug being formed with a frusto-conical surface interposed between the first and second shoulders; and
   (b) the gasket fingers conform to the valve stem plug frusto-conical surface.

12. A method of flushing in place a sanitary fluid control apparatus, comprising the steps of:
   (a) providing a control apparatus housing means having a valve seat;
   (b) providing motor means mounted to the housing means;
   (c) providing a valve stem and gasket assembly actuated by the motor means to control the flow of fluid through the control apparatus by engaging and disengaging the gasket with the valve seat, the gasket being retained on the valve stem and being adapted for axial and lateral movement relative to the valve stem to provide clearance between the valve stem and gasket when the gasket is not in engagement with the valve seat;
   (d) actuating the motor means to open the control apparatus to fluid flow; and
   (e) flushing a washing fluid through the control apparatus, so that the washing fluid flows through the clearance between the valve stem and gasket to clean them in place.

13. The method of claim 12 wherein the valve stem has a valve stem shaft connected to the motor means and a valve stem plug having first and second axially spaced peripheral shoulders extending therefrom, and wherein the gasket has an axial length less than the axial spacing between the valve stem plug shoulders, the gasket being retained between the first and second shoulders, the gasket having a plurality of resilient fingers adapted to deflect upon contact with the first shoulder for assembly and to resiliently snap back to engage the first shoulder to permanently retain the gasket between the first and second shoulders when in the relaxed condition.

14. The method of claim 13 wherein the valve stem plug is formed with a frusto-conical surface interposed between the first and second shoulders, and wherein the gasket fingers conform to the frusto-conical surface.

15. The method of claim 14 wherein:
   (a) the base end of the valve stem plug frusto-conical surface terminates in an external surface that tapers in the same general direction as the frusto-conical surface; and
   (b) the gasket is formed with an annular ring having a tapered internal surface conforming to the valve head external surface, so that a path of increased conductivity to the washing fluid is provided in the clearance between the valve stem plug and gasket ring tapered surfaces.

* * * * *